(12) United States Patent
Kubo et al.

(10) Patent No.: US 8,584,645 B2
(45) Date of Patent: Nov. 19, 2013

(54) VEHICLE INCLUDING A VARIABLE INTAKE PIPE LENGTH DEVICE

(75) Inventors: Katsuhiro Kubo, Wako (JP); Kaoru Hanawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1373 days.

(21) Appl. No.: 12/334,885

(22) Filed: Dec. 15, 2008

(65) Prior Publication Data
US 2009/0165741 A1  Jul. 2, 2009

(30) Foreign Application Priority Data
Dec. 28, 2007 (JP) ................. 2007-340695

(51) Int. Cl.
*F02M 35/104* (2006.01)

(52) U.S. Cl.
USPC ............. 123/184.55; 123/184.53; 123/184.21

(58) Field of Classification Search
USPC .................................................. 123/184.55
See application file for complete search history.

(56) References Cited

U.S. PATENT DOCUMENTS 5,740,770 A * 4/1998 Morota .................... 123/184.55

FOREIGN PATENT DOCUMENTS

| DE | 10120218 A1 | 1/2003 |
|---|---|---|
| EP | 1777386 A1 | 4/2007 |
| JP | 2007-218243 A | 8/2007 |

* cited by examiner

*Primary Examiner* — Lindsay Low
(74) *Attorney, Agent, or Firm* — Westerman, Hattori, Daniels & Adrian, LLP (57) ABSTRACT

A vehicle includes a variable intake pipe length device capable of adjusting the length of an intake pipe according to the condition of an engine, the intake pipe being provided in an intake passage for inducing air from an air cleaner box to an intake port of the engine, the intake pipe including a fixed funnel and a movable funnel movable relative to the fixed funnel by a driving force of an actuator. A rotating pipe as a part of the intake pipe is rotationally driven by the actuator, and the movable funnel is moved by rotating the rotating pipe, thereby varying the length of the intake pipe.

9 Claims, 12 Drawing Sheets

VEHICLE INCLUDING A VARIABLE INTAKE PIPE LENGTH DEVICE

TECHNICAL FIELD

The present invention relates to a vehicle including a variable intake pipe length device.

BACKGROUND OF THE INVENTION

An intake device for a vehicle utilizes the effects of intake inertia, intake pulsation, and intake resonance to improve the volumetric efficiency of intake air. The intake device can include a variable intake pipe length device capable of varying the length of an intake pipe to obtain the above effects in a wide range of engine speeds.

Conventionally known is a vehicle including a variable intake pipe length device such that a plurality of movable funnels for a plurality of cylinders are connected and driven by a single actuator and a link mechanism (see Japanese Patent Laid-open No. 2007-218243, for example).

In Japanese Patent Laid-open No. 2007-218243, a throttle body is connected to a cylinder head of an engine, and a cleaner box is connected to the throttle body.

The cleaner box contains a fixed funnel connected to the throttle body, a movable funnel adapted to be connected to or separated from the fixed funnel, and a funnel moving mechanism for moving the movable funnel. A motor as a drive source for the funnel moving mechanism is provided so as to project out of the cleaner box.

The funnel moving mechanism includes a support column mounted on the fixed funnel, a parallel link pivotably mounted through two pivot shafts to the support column, a moving member and moving shaft connected to the parallel link, and a rotation lever connected to the moving shaft and mounted on an output shaft of the motor.

When the output shaft of the motor is rotated, the moving member and the moving shaft are moved to swing the parallel link about the two pivot shafts. As a result, the movable funnel is connected to the fixed funnel to obtain a long intake pipe length corresponding to a low engine speed. Conversely, the movable funnel is separated from the fixed funnel to obtain a short intake pipe length corresponding to a high engine speed.

The funnel moving mechanism having the parallel link connects the movable funnels for the four cylinders and it is composed of many parts, causing a large size and largely projecting before the movable funnels.

Further, the number of parts of the funnel moving mechanism for moving the movable funnels is large.

SUMMARY OF THE INVENTION

It is accordingly an object of the present invention to provide a variable intake pipe length device which can be reduced in size and also reduced in number of parts.

In accordance with a first aspect of the invention, there is provided a vehicle including a variable intake pipe length device capable of adjusting the length of an intake pipe according to the condition of an engine, the intake pipe being provided in an intake passage for inducing air from an air cleaner box to an intake port of the engine, the intake pipe including a fixed funnel and a movable funnel movable relative to the fixed funnel by a driving force of an actuator. A rotating part of the intake pipe is rotationally driven by the actuator, and the movable funnel is moved by rotating the rotating part of the intake pipe, thereby varying the length of the intake pipe.

The rotating part of the intake pipe is used as a member for moving the movable funnel. Accordingly, the number of parts can be reduced and the size of the variable intake pipe length device can therefore be reduced.

In accordance with a second aspect of the invention, the rotating part of the intake pipe is a rotating pipe to be rotated by the actuator, a spiral slit is formed at a cylindrical portion of the rotating pipe, and the movable funnel is formed with an inward projection engaged with the spiral slit, so that when the rotating pipe is rotated, the movable funnel is moved with the rotation of the spiral slit to thereby vary the length of the intake pipe.

When the rotating pipe is rotated by the actuator, the inward projection engaged with the spiral slit is moved in the axial direction of the rotating pipe with the rotation of the spiral slit. By the axial movement of the inward projection, the movable funnel is axially moved to thereby vary the length of the intake pipe.

In accordance with a third aspect of the invention, the fixed funnel guides the movement of the movable funnel.

While the movable funnel is being moved, the movement of the movable funnel is guided by the fixed funnel. Accordingly, the movable funnel can be smoothly moved.

In accordance with a fourth aspect of the invention, the fixed funnel is formed with an axially extending vertical slit for preventing the rotation of the movable funnel and guiding the movement of the movable funnel, and the movable funnel is formed with an outward projection engaged with the vertical slit.

The movable funnel is axially moved in the condition where the outward projection of the movable funnel is engaged with the vertical slit of the fixed funnel, so that the rotation of the movable funnel is prevented. Accordingly, the movable funnel can be moved more smoothly.

In accordance with a fifth aspect of the invention, when the rotational speed of the engine becomes a predetermined speed or more, the movable funnel is moved by the rotation of the rotating pipe driven by the actuator, so that the length of the intake pipe is reduced to a small value smaller than a predetermined length, such that the rotating pipe is stored inside of the movable funnel.

When the engine speed becomes a predetermined speed or more, the rotating pipe is rotated by the actuator and the movable funnel is moved by the rotation of the rotating pipe. Accordingly, the length of the intake pipe is reduced to a small value smaller than a predetermined length. At this time, the movable funnel is moved to a position where the rotating pipe is stored inside of the movable funnel. Accordingly, any step between the movable funnel and the rotating pipe can be eliminated, so that a high-velocity flow of intake air in a high engine speed region can be made smooth.

In accordance with a sixth aspect of the invention, when the operator of the vehicle operates to stop the engine, the movable funnel is driven by the actuator under the control of a control means to set a large value for the length of the intake pipe for the next starting of the engine.

When the operator of the vehicle stops the engine, the control means operates the actuator to move the movable funnel so that the length of the intake pipe becomes a large value for a low engine speed ready for the next starting of the engine.

In accordance with a seventh aspect of the invention, means for maintaining the raised position of the movable funnel to prevent lowering of the movable funnel, due to its own weight when the operation of the actuator is stopped, is provided between the actuator and the movable funnel.

Even when the operation of the actuator is stopped, lowering of the movable funnel from the raised position due to its own weight can be prevented by the maintaining means provided between the actuator and the movable funnel. Accordingly, a desired engine performance can be ensured.

In accordance with an eighth aspect of the invention, the means for maintaining the raised position of the movable funnel is a horizontal slit extending in the circumferential direction of the rotating pipe so as to be formed as a part of the spiral slit or formed continuously to the spiral slit.

The horizontal slit is formed as a part of the spiral slit, so that the raised position of the movable funnel can be maintained by a simple structure.

According to the first aspect of the invention, a rotating part of the intake pipe is rotationally driven by the actuator, and the movable funnel is moved by rotating this rotating part of the intake pipe, thereby varying the length of the intake pipe. If the movable funnel is driven by a link mechanism, for example, the link mechanism may become large in size for a multicylinder engine and the number of parts may also be increased. To the contrary, according to the present invention, a part of the intake pipe is rotationally driven by the actuator. Accordingly, the number of parts can be reduced to thereby reduce the size of the variable intake pipe length device, and the cost can therefore be suppressed.

According to the second aspect of the invention, the rotating part of the intake pipe is provided by a rotating pipe to be rotated by the actuator. A spiral slit is formed at a cylindrical portion of the rotating pipe, and the movable funnel is formed with an inward projection. This inward projection of the movable funnel is engaged with the spiral slit of the rotating pipe, so that when the rotating pipe is rotated, the movable funnel is moved to vary the length of the intake pipe. Accordingly, the variable intake pipe length device can be configured by a simple structure and can be reduced in size.

According to the third aspect of the invention, the fixed funnel functions to guide the movement of the movable funnel. Accordingly, the movement of the movable funnel can be made smooth by the fixed funnel.

According to the fourth aspect of the invention, the fixed funnel is formed with an axially extending vertical slit for preventing the rotation of the movable funnel and guiding the movement of the movable funnel, and the movable funnel is formed with an outward projection. This outward projection of the movable funnel is engaged with the vertical slit of the fixed funnel, so that the movement of the movable funnel can be made smoother with the rotation thereof prevented by the engagement of the outward projection and the vertical slit.

According to the fifth aspect of the invention, when the rotational speed of the engine becomes a predetermined speed or more, the movable funnel is moved by the rotation of the rotating pipe driven by the actuator, so that the length of the intake pipe is reduced to a small value smaller than a predetermined length, such that the rotating pipe is stored inside of the movable funnel. Accordingly, any step between the movable funnel and the rotating pipe can be eliminated, so that a high-velocity flow of intake air in a high engine speed region can be made smoother to thereby further improve the engine performance.

According to the sixth aspect of the invention, when the operator of the vehicle stops the engine, the movable funnel is driven by the actuator under the control of the control means to set a large value for the length of the intake pipe at starting of the engine. Accordingly, the intake pipe length at engine starting can be optimized.

According to the seventh aspect of the invention, the means for maintaining the raised position of the movable funnel to prevent lowering of the movable funnel, due to its own weight when the operation of the actuator is stopped, is provided between the actuator and the movable funnel. Accordingly, even when the operation of the actuator is stopped, the length of the intake pipe can be maintained at an optimum length to thereby ensure a desired engine performance.

According to the eighth aspect of the invention, the means for maintaining the raised position of the movable funnel is provided by a horizontal slit extending in the circumferential direction of the rotating pipe so as to be formed as a part of the spiral slit or formed continuously to the spiral slit. By the formation of the horizontal slit, lowering of the movable funnel in the raised condition thereof can be prevented, so that an unexpected change in intake pipe length can be easily prevented by a simple structure.

DETAILED DESCRIPTION OF THE INVENTION

The advantages of the invention will become apparent in the following description taken in conjunction with the drawings, wherein.

Some preferred embodiments of the present invention will now be described with reference to the drawings. The orientation of each drawing is the same as that of the reference numerals included therein.

Figure 1:
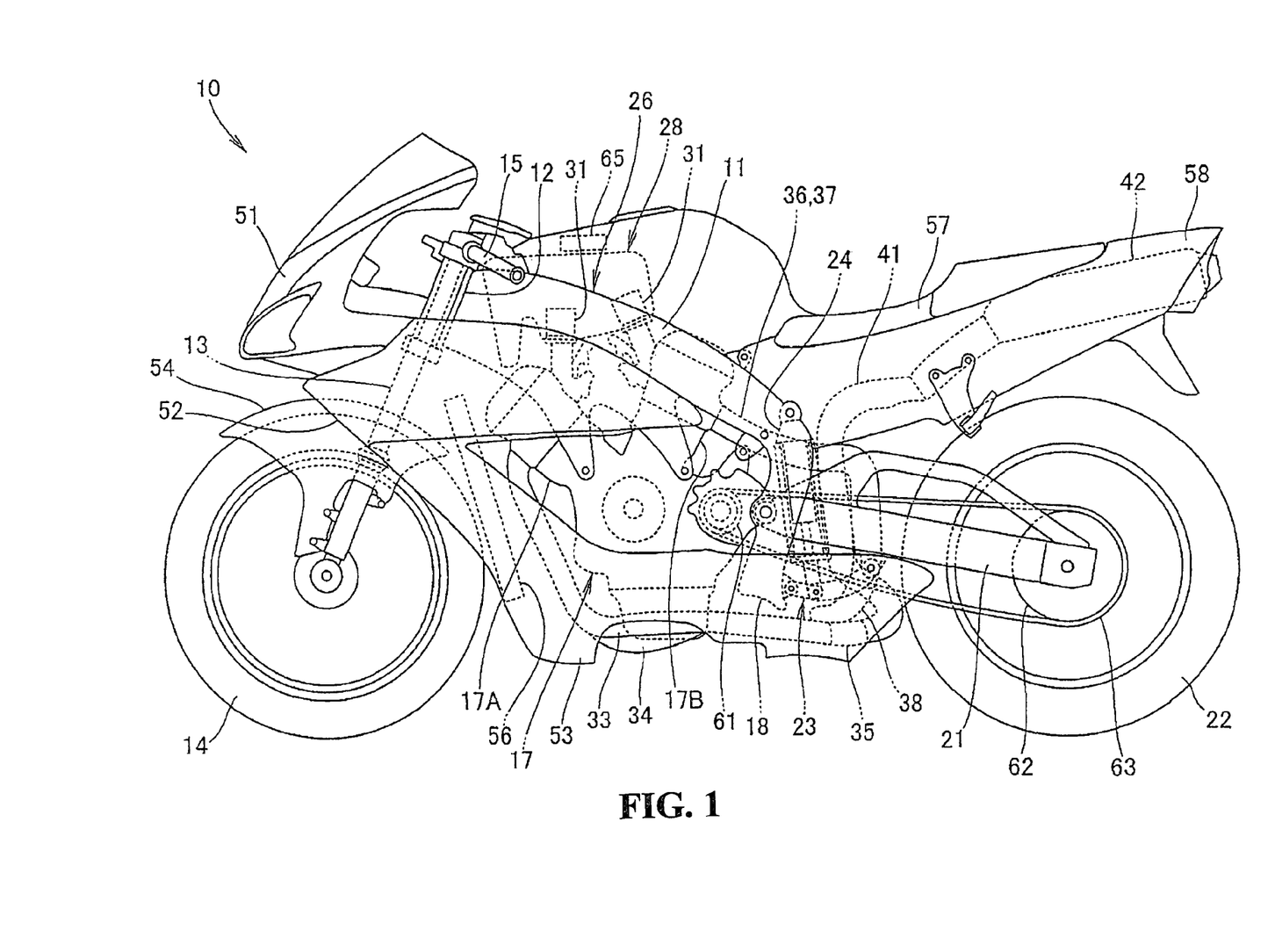
FIG. 1 is a side view of a vehicle to which a first preferred embodiment of the present invention is applied.

FIG. 1 is a side view of a vehicle 10 to which a first preferred embodiment of the present invention is applied. The vehicle 10 is a motorcycle having a main frame 11, a head pipe 12 provided at the front end of the main frame 11, a front fork 13 steerably mounted to the head pipe 12, a front wheel 14 mounted to the lower end portion of the front fork 13, a pair of left and right handles 15 and 16 (only the left handle 15 being shown) mounted to the upper end of the front fork 13, an engine 17 mounted to the lower portion of the main frame 11, a pivot plate 18 formed integrally with the main frame 11 at its rear portion, a swing arm 21 vertically swingably mounted to the pivot plate 18, a rear wheel 22 mounted to the rear end portion of the swing arm 21, a link mechanism 23 connected between the lower portion of the swing arm 21 and the pivot plate 18, and a rear cushion unit 24 connected between the link mechanism 23 and the rear upper portion of the main frame 11.

The main frame 11, the head pipe 12, and the pivot plate 18 constitute a body frame 26.

The engine 17 is, for example, a V-type four-cylinder engine having a front cylinder 17A and a rear cylinder 17B. An intake device 28 is connected to the front cylinder 17A and the rear cylinder 17B. The intake device 28 includes a pair of front and rear variable intake pipe length devices 31 respectively connected to the front and rear cylinders 17A and 17B. Two exhaust pipes 33 and 34 are connected to the front cylinder 17A so as to extend therefrom obliquely downward and horizontally rearward. These exhaust pipes 33 and 34 are joined together at a manifold portion 35. Similarly, two exhaust pipes 36 and 37 are connected to the rear cylinder 17B so as to extend therefrom obliquely downward and vertically downward. These exhaust pipes 36 and 37 are joined together at a manifold portion 38. Further, a rear exhaust pipe 41 is connected to the manifold portions 35 and 38 so as to extend therefrom vertically upward and obliquely upward. A muffler 42 is connected to the rear exhaust pipe 41.

The vehicle 10 further has a front cowl 51, middle cowl 52, lower cowl 53, front fender 54, radiator 56, seat 57, rear cowl 58, drive sprocket 61, driven sprocket 62, chain 63, and engine control unit 65.

Figure 2:
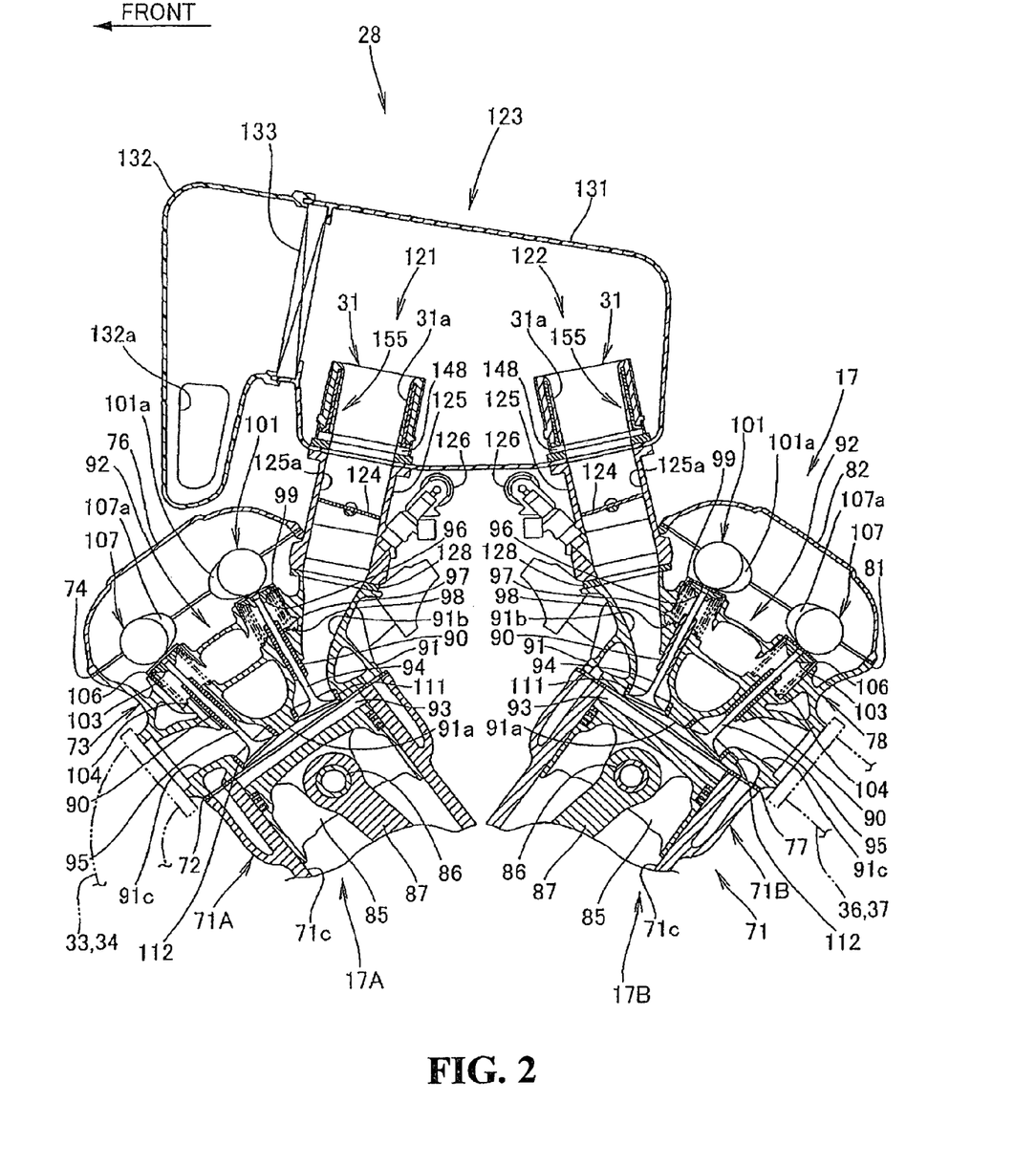
FIG. 2 is a sectional view showing an essential part of an engine and an intake device according to the first preferred embodiment.

FIG. 2 is a sectional view showing an essential part of the engine 17 and the intake device 28 according to the first preferred embodiment.

In FIG. 2, the arrow shown by "FRONT" represents the front side of the vehicle 10.

The engine 17 has a cylinder block 71. The cylinder block 71 is formed at its upper portion with a front cylinder portion 71A and a rear cylinder portion 71B. A front cylinder head 73 is mounted on the front cylinder portion 71A through a head gasket 72, and a front head cover 76 is mounted on the front cylinder head 73 through a head cover gasket 74. Similarly, a rear cylinder head 78 is mounted on the rear cylinder portion 71B through a head gasket 77, and a rear head cover 82 is mounted on the rear cylinder head 78 through a head cover gasket 81.

The front cylinder portion 71A is formed with two cylinder bores 71c. A piston 85 is movably fitted in each cylinder bore 71c, and a connecting rod 87 is connected through a piston pin 86 to the piston 85.

Similarly, the rear cylinder portion 71B is formed with two cylinder bores 71c. A piston 85 is movably fitted in each cylinder bore 71c, and a connecting rod 87 is connected through a piston pin 86 to the piston 85.

The front cylinder 17A includes the front cylinder portion 71A, the two pistons 85, the two piston pins 86, the two connecting rods 87, the head gasket 72, the front cylinder head 73, the head cover gasket 74, and the front head cover 76.

Similarly, the rear cylinder 17B includes the rear cylinder portion 71B, the two pistons 85, the two piston pins 86, the two connecting rods 87, the head gasket 77, the rear cylinder head 78, the head cover gasket 81, and the rear head cover 82.

Thus, the front cylinder 17A and the rear cylinder 17B have the same basic structure, so only the front cylinder 17A will now be described.

The front cylinder head 73 is composed of a cylinder head body 91 and a valve operating mechanism 92 mounted to the cylinder head body 91.

The cylinder head body 91 is formed with a recess 91a, an intake port 91b extending from the recess 91a to the rear surface of the cylinder head body 91, and an exhaust port 91c extending from the recess 91a to the front surface of the cylinder head body 91. A combustion chamber 93 is formed by the cylinder bore 71c, the piston 85, and the recess 91a.

The valve operating mechanism 92 includes an intake valve 94 movably mounted through a valve guide 90 to the cylinder head body 91 for operatively closing an opening of the intake port 91b exposed to the combustion chamber 93, an exhaust valve 95 movably mounted through a valve guide 90 to the cylinder head body 91 for operatively closing an opening of the exhaust port 91c exposed to the combustion chamber 93, a retainer 96 mounted at the upper end of the intake valve 94, a pair of valve springs 97 and 98 provided between the retainer 96 and the cylinder head body 91 for biasing the intake valve 94 in a valve closing direction, a valve lifter 99 slidably fitted in the cylinder head body 91 so as to cover the upper end of the intake valve 94, the retainer 96, and the upper ends of the valve springs 97 and 98, a camshaft 101 having a cam 101a kept in direct contact with the valve lifter 99 for pushing down the valve lifter 99 to open the intake valve 94, a retainer 103 mounted at the upper end of the exhaust valve 95, a valve spring 104 provided between the retainer 103 and the cylinder head body 91 for biasing the exhaust valve 95 in a valve closing direction, a valve lifter 106 slidably fitted in the cylinder head body 91 so as to cover the upper end of the exhaust valve 95, the retainer 103, and the upper end of the valve spring 104, and a camshaft 107 having a cam 107a kept in direct contact with the valve lifter 106 for pushing down the valve lifter 106 to open the exhaust valve 95. Further, a valve seat 111 is provided at the opening of the intake port 91b exposed to the combustion chamber 93, and a valve seat 112 is provided at the opening of the exhaust port 91c exposed to the combustion chamber 93.

The intake device 28 includes a front intake passage portion 121 mounted to the front cylinder head 73, a rear intake passage portion 122 mounted to the rear cylinder head 78, and an air cleaner box 123 mounted to the front intake passage portion 121 and the rear intake passage portion 122.

The front intake passage portion 121 is composed of a throttle body 125 having two air passages 125a respectively straight communicating with the two intake ports 91b of the front cylinder head 73, two fuel injection valves 126 mounted to the rear side surface of the throttle body 125 for injecting fuel into the two intake ports 91b, and the front variable intake pipe length device 31 mounted to the throttle body 125 in such a manner that two air passages 31a of the front variable intake pipe length device 31 are respectively aligned to the two air passages 125a of the throttle body 125. A throttle valve 124 is provided in each air passage 125a of the throttle body 125. A sealing gasket 128 is provided between the cylinder head body 91 and the throttle body 125.

The basic structure of the rear intake passage portion 122 is the same as that of the front intake passage portion 121, so the detailed description of the rear intake passage portion 122 will be omitted herein.

The air cleaner box 123 is composed of an air cleaner body 131, an air cleaner cover 132 for closing a front opening of the air cleaner body 131, and an air cleaner element 133 fixed between the air cleaner body 131 and the air cleaner cover 132 in the vicinity of the front opening of the air cleaner body 131. The air cleaner box 123 is fixed between the throttle bodies 125 for the front and rear cylinders 17A and 17B and the variable intake pipe length devices 31 for the front and rear cylinders 17A and 17B. The air cleaner cover 132 is formed with an intake opening 132a.

Figure 3:
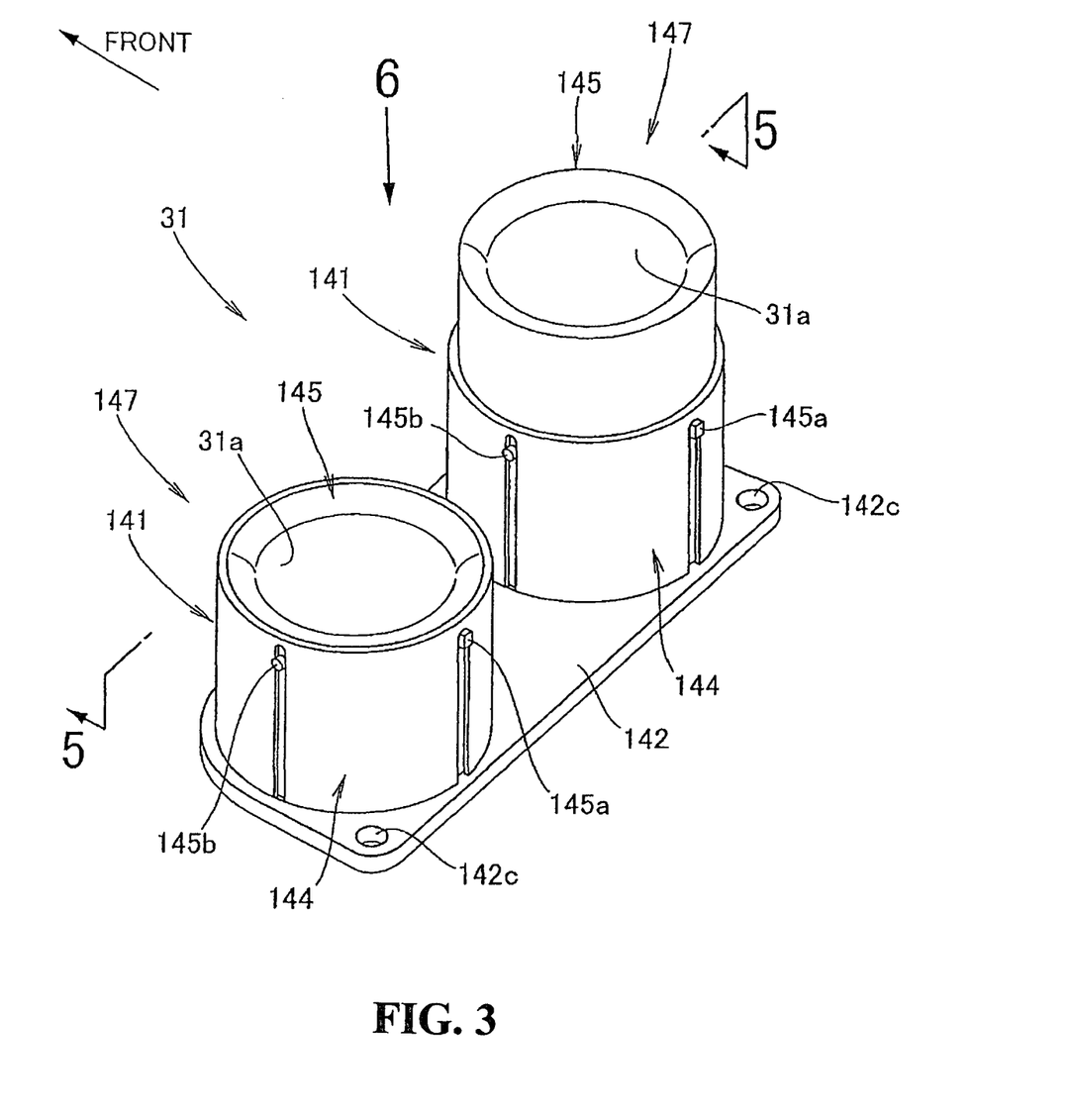
FIG. 3 is a perspective view of a variable intake pipe length device according to the first preferred embodiment.

FIG. 3 is a perspective view of the front variable intake pipe length device 31 according to the first preferred embodiment. The variable intake pipe length device 31 shown in FIG. 3 is composed of two variable-length air funnels 141 respectively provided for the two cylinders in the front cylinder 17A (see FIG. 2) and a base plate 142 for supporting the two variable-length air funnels 141. Each variable-length air funnel 141 includes a fixed funnel 144 mounted to the base plate 142 and a movable funnel 145 movably inserted in the fixed funnel 144.

As shown in FIG. 3, the left variable-length air funnel 141 is in a short condition where the movable funnel 145 is fully inserted in the fixed funnel 144, and the right variable-length air funnel 141 is in a long condition where the movable funnel 145 is fully projected upward from the fixed funnel 144. However, these different conditions of the right and left variable-length air funnels 141 are shown for the purpose of illustration, and these two variable-length air funnels 141 normally have the same condition according to the condition of the engine 17. More specifically, when the engine speed is lower than a predetermined speed, both the two variable-length air funnels 141 have the long condition, whereas when the engine speed is higher than or equal to the predetermined speed, both the two variable-length air funnels 141 have the short condition.

Figure 4:
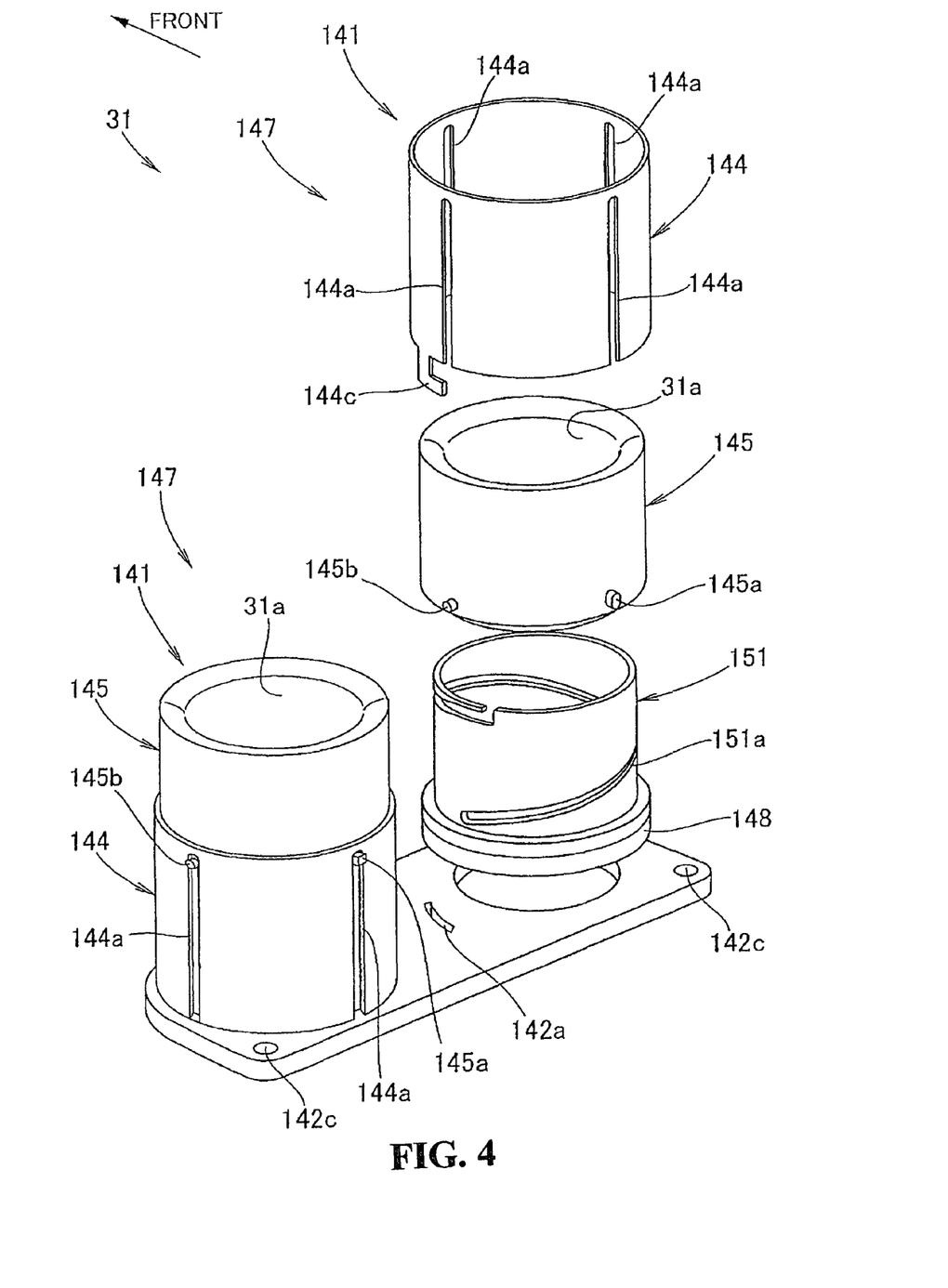
FIG. 4 is a partially exploded perspective view of the variable intake pipe length device shown in FIG. 3.

FIG. 4 is an exploded perspective view of the variable intake pipe length device 31 shown in FIG. 3, wherein the right variable-length air funnel 141 is exploded. Each variable-length air funnel 141 includes the fixed funnel 144, the movable funnel 145, a rotating pipe 151 rotatably inserted in the movable funnel 145, and an actuator 148 for rotating the rotating pipe 151.

The fixed funnel 144 is formed with four vertical slits 144a and two L-shaped mounting hooks 144c (one of which being shown in FIG. 4) extending from the lower end of the fixed funnel 144.

The movable funnel 145 is formed with four projections 145a and 145b (two of which being shown in FIG. 4) projecting from the outer circumferential surface of the movable funnel 145.

The rotating pipe 151 is formed with a spiral slit 151a.

Figure 5:
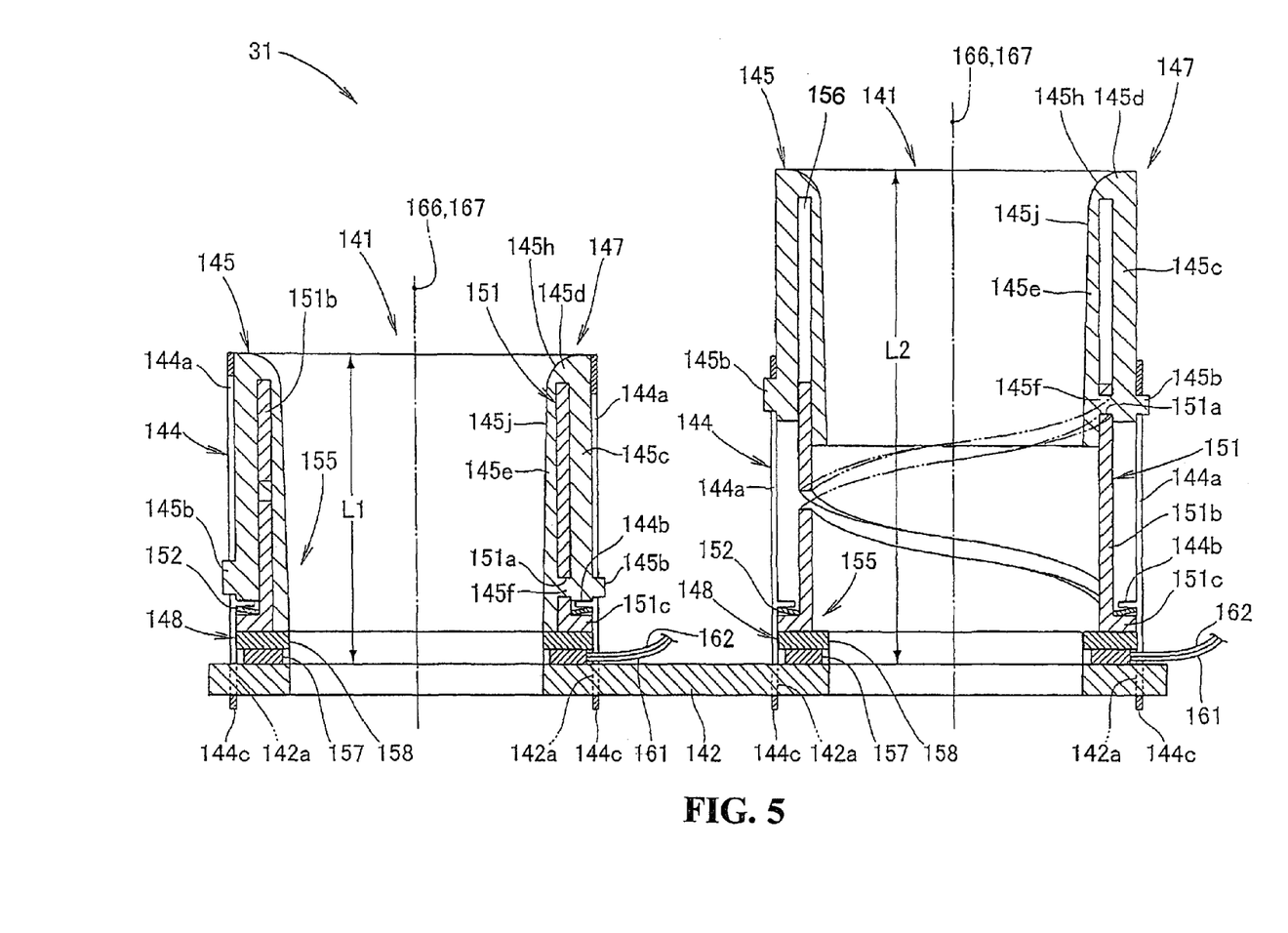
FIG. 5 is a cross section taken along the line 5-5 in FIG. 3.

FIG. 5 is a cross section taken along the line 5-5 in FIG. 3, wherein the left variable-length air funnel 141 is in the short condition and the right variable-length air funnel 141 is in the long condition.

As shown in FIG. 5, each variable-length air funnel 141 includes the fixed funnel 144, the movable funnel 145, the rotating pipe 151 for moving the movable funnel 145, the ring-like actuator 148 mounted on the base plate 142 for rotating the rotating pipe 151, and a disc spring 152 for pressing the rotating pipe 151 against the actuator 148.

In each variable-length air funnel 141, the fixed funnel 144, the movable funnel 145, and the rotating pipe 151 constitute an intake pipe 147.

The length (intake pipe length) of the left intake pipe 147 in the short condition is shown by L1, and the length (intake pipe length) of the right intake pipe 147 in the long condition is shown by L2.

The fixed funnel 144 is a cylindrical member, which is formed with the four vertical slits 144a extending axially, an inward projecting wall 144b projecting inward from the inner surface, and the two L-shaped mounting hooks 144c inserted through and engaged with two arcuate slits 142a formed through the base plate 142.

The movable funnel 145 is composed of an outer cylinder 145c, an inner cylinder 145e, an annular upper connecting portion 145d for integrally connecting the upper ends of the outer cylinder 145c and the inner cylinder 145e, and a pin-like connecting portion 145f for integrally connecting the lower end portions of the outer cylinder 145c and the inner cylinder 145e. The four projections 145a and 145b (only the two projections 145b being shown in FIG. 5, the other two projections 145a being shown in FIGS. 3 and 4) are formed on the outer circumferential surface of the outer cylinder 145c so as to be inserted through the four vertical slits 144a of the fixed funnel 144 and guided along the vertical slits 144a.

The upper connecting portion 145d has an arcuate surface 145h, and the inner cylinder 145e has a tapering inner surface 145j continuing to the arcuate surface 145h of the upper connecting portion 145d. The tapering inner surface 145j of the inner cylinder 145e is tapered downward in such a manner that the inner diameter of the inner cylinder 145e is gradually decreased toward its lower end. With this structure, the flow velocity of intake air can be increased.

The rotating pipe 151 is composed of a cylindrical portion 151b inserted in a space 156 defined between the outer cylinder 145c and the inner cylinder 145e of the movable funnel 145 so as to be projectable from the space 156, and a flange portion 151c formed integrally with the cylindrical portion 151b at its lower end. The flange portion 151c is pressed against the actuator 148 by the coned disc spring 152. The cylindrical portion 151b is formed with the spiral slit 151a for guiding the pin-like connecting portion 145f of the movable funnel 145.

The actuator 148 is provided by an ultrasonic motor 155, and the rotating pipe 151 as a part of the intake pipe 147 functions as the rotor of the ultrasonic motor 155.

The actuator 148 is composed of a piezoelectric ceramic 157 as a source of ultrasonic vibration and a mechanical vibrator 158 to be vibrated by the piezoelectric ceramic 157. The natural frequency of the mechanical vibrator 158 falls in an ultrasonic region (not less than 20 kHz). Conductors 161 and 162 are connected to the piezoelectric ceramic 157.

The actuator 148 has an axis 166, and the rotating pipe 151 has an axis 167 as an axis of rotation, which coincides with the axis of intake pipe 147. The actuator 148 is located so that its axis 166 coincides with the axis 167 of the rotating pipe 151.

When the mechanical vibrator 158 is vibrated, the upper surface of the mechanical vibrator 158 undulates in the circumferential direction to generate a traveling wave. A point on the traveling wave (a point on the upper surface of the mechanical vibrator 158) makes an elliptical motion along a plane perpendicular to the upper surface of the mechanical vibrator 158. Accordingly, when this point is moved in the circumferential direction of the mechanical vibrator 158, a point on the lower surface of the flange portion 151c of the rotating pipe 151 pressed against the mechanical vibrator 158 is moved together in contact with the point on the upper surface of the mechanical vibrator 158. As a result, the flange portion 151c is rotated, i.e., the rotating pipe 151 is rotated.

When the rotating pipe 151 is rotated, the spiral slit 151a is also rotated. Since the pin-like connecting portion 145f of the movable funnel 145 is inserted through the spiral slit 151a, the movable funnel 145 is raised or lowered by the rotation of the spiral slit 151a and the four projections 145a and 145b of the movable funnel 145 are guided along the vertical slits 144a of the fixed funnel 144.

In each variable-length air funnel 141, the flange portion 151c of the rotating pipe 151 is pressed against the mechanical vibrator 158 of the actuator 148 by the disc spring 152. Accordingly, a frictional force can be generated between the mechanical vibrator 158 and the flange portion 151c, so that even when the actuator 148 is stopped in the raised condition of the movable funnel 145, it is possible to prevent a possibility that the rotating pipe 151 may spontaneously rotate to cause lowering of the movable funnel 145.

Figure 6:
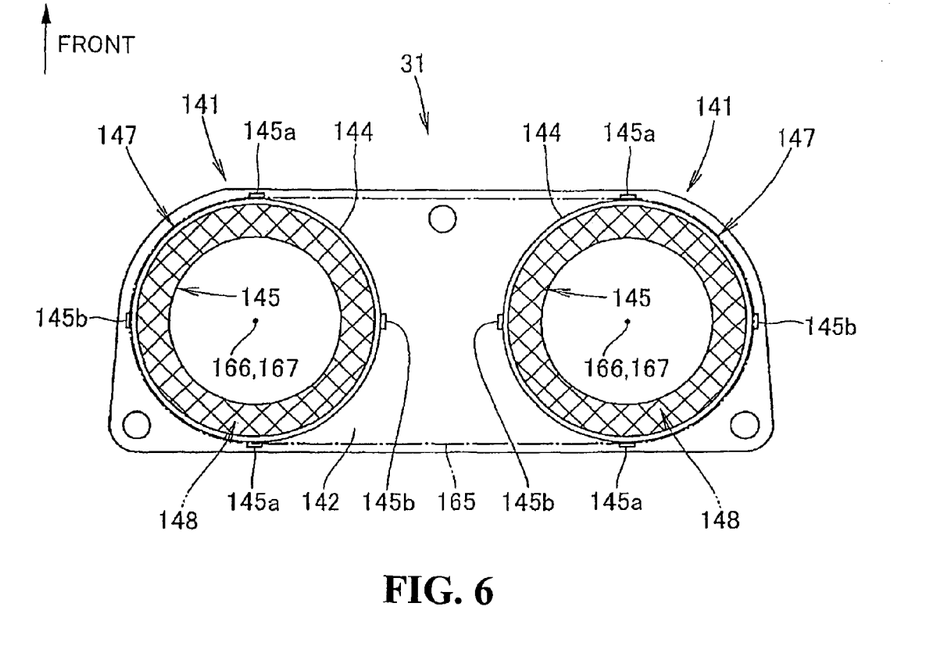
FIG. 6 is a view taken in the direction shown by an arrow 6 in FIG. 3.

FIG. 6 is a view taken in the direction shown by an arrow 6 in FIG. 3. As shown in FIG. 6, the two actuators 148 (crosshatched areas) are located inside of an envelope 165 (chain line forming an oval shape) formed by the contours of the two intake pipes 147, i.e., by the contours of the two fixed funnels 144.

Since the actuators 148 are located inside of the envelope 165 formed by the contours of the intake pipes 147, the variable-length air funnels 141 can be reduced in size. Accordingly, the variable intake pipe length device 31 can be reduced in size.

Figure 7:
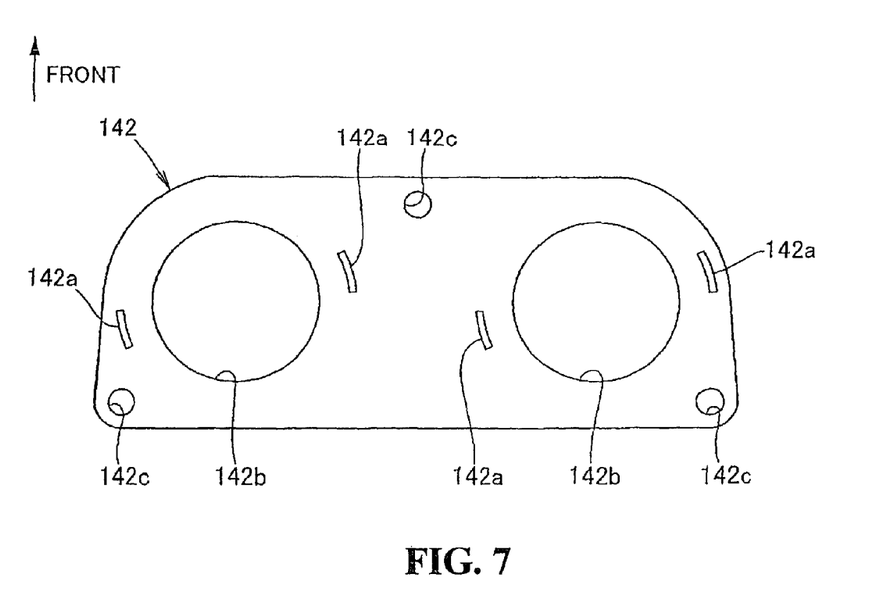
FIG. 7 is a plan view of a base plate according to the first preferred embodiment.

FIG. 7 is a plan view of the base plate 142. As shown in FIG. 7, the base plate 142 is formed with two through holes 142b as intake passages, two pairs of arcuate slits 142a respectively located about the two through hole 142b, and three bolt insertion holes 142c for insertion of bolts for mounting the base plate 142 (i.e., the variable intake pipe length device 31) to the corresponding throttle body 125 (see FIG. 2).

Figure 8A:
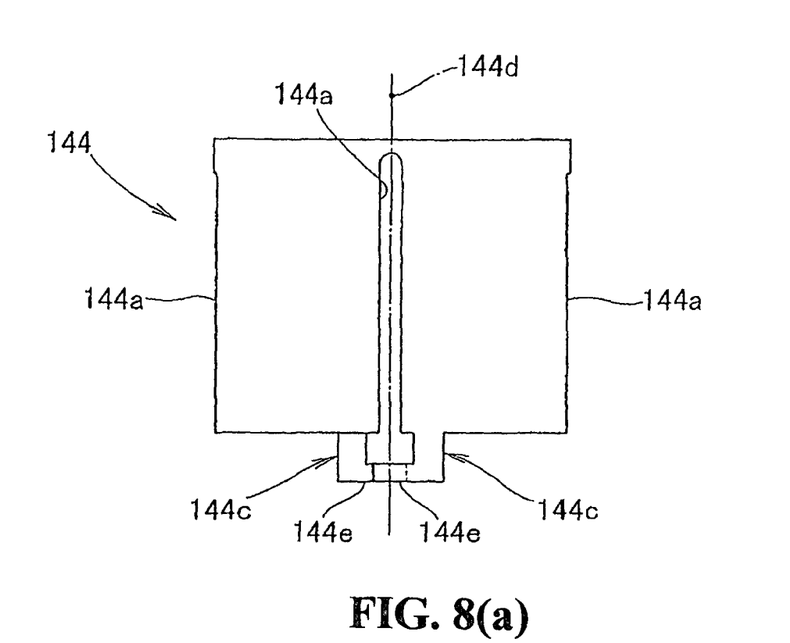
FIG. 8 shows views of a fixed funnel according to the first preferred embodiment.
Figure 8B:
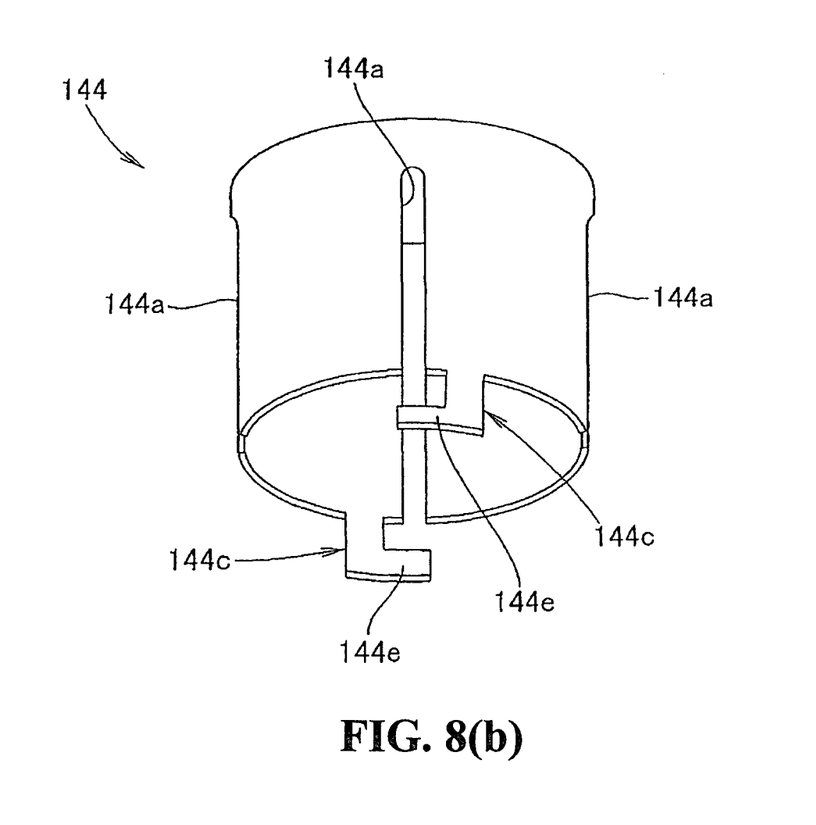

FIG. 8(a) is a side view of the fixed funnel 144, and FIG. 8(b) is a perspective view of the fixed funnel 144 as viewed from the lower side thereof.

As shown in FIG. 8(a), the fixed funnel 144 has an axis 144d, and each vertical slit 144a of the fixed funnel 144 extends parallel to the axis 144d. Each vertical slit 144a is open at its lower end for the purpose of insertion of the corresponding projection 145a (or 145b) of the movable funnel 145 (see FIG. 5).

The two L-shaped mounting hooks 144c are located so as to intersect the extensions from the lower ends of any two opposed ones of the four vertical slits 144a.

As shown in FIG. 8(b), the two L-shaped mounting hooks 144c of the fixed funnel 144 have horizontal portions 144e projecting in the same circumferential direction.

Accordingly, in mounting the fixed funnel 144 to the base plate 142 (see FIG. 7), the two L-shaped mounting hooks 144c are first inserted through the respective two arcuate slits 142a of the base plate 142 (see FIG. 7). Thereafter, the fixed funnel 144 is rotated clockwise as viewed in plan. Since the horizontal portions 144e of the two L-shaped mounting hooks 144c project in the same circumferential direction, the horizontal portions 144e are engaged with the lower surface of the base plate 142 at positions near the arcuate slits 142a, thereby preventing withdrawal of the fixed funnel 144 from the base plate 142.

Figure 9:
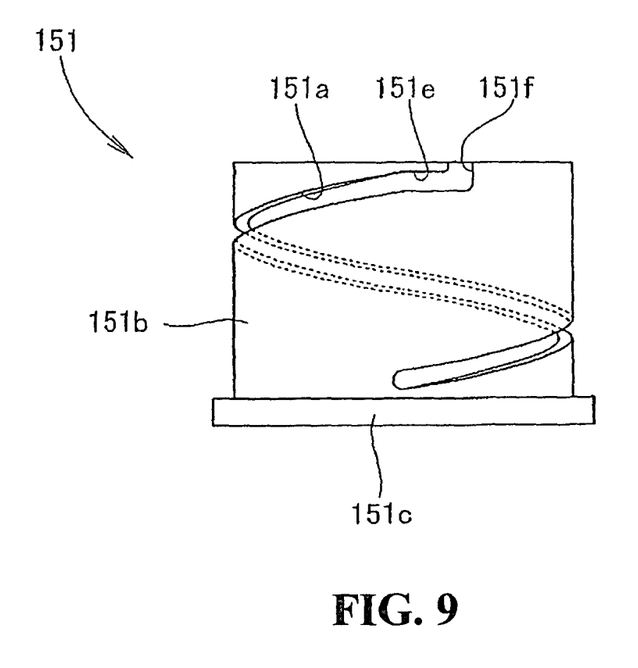
FIG. 9 is a side view of a rotating pipe according to the first preferred embodiment.

FIG. 9 is a side view of the rotating pipe 151. As shown in FIG. 9, the spiral slit 151a of the rotating pipe 151 has one end (lower end) in the vicinity of the flange portion 151c and the other end (upper end) connected to a horizontal slit 151e extending in the circumferential direction of the cylindrical portion 151b. The horizontal slit 151e is connected to a vertical slit 151f extending in the axial direction of the rotating pipe 151. The vertical slit 151f is open at the upper end of the cylindrical portion 151b.

Thus, the horizontal slit 151e is formed so as to continue to the upper end of the spiral slit 151a. Accordingly, even when the actuator 148 is stopped in the raised condition of the movable funnel 145, it is possible to prevent a possibility that the movable funnel 145 projecting from the fixed funnel 144 may lower due to its own weight. Thus, the raised condition of the movable funnel 145 can be maintained in addition to the frictional force between the mechanical vibrator 158 and the flange portion 151c of the rotating pipe 151 under the pressure of the disc spring 152 as shown in FIG. 5. Accordingly, the length of the intake pipe 147 can be maintained at an optimum length. Further, lowering of the movable funnel 145 can be prevented easily and reliably by the horizontal slit 151e that is a simple structure.

The operation of the variable intake pipe length device 31 will now be described.

When starting the engine 17 shown in FIGS. 1 and 2, the engine 17 is in an idling condition or a near idling condition. That is, the rotational speed of the engine 17 is low. In such a low-speed condition of the engine 17, each intake pipe 147 in the variable intake pipe length device 31 is in the long condition where each movable funnel 145 is raised as shown in the right intake pipe 147 in FIG. 5, thereby increasing the volumetric efficiency of intake air at a low engine speed.

When the engine speed is increased to reach a predetermined speed (e.g., 4000 rpm), each intake pipe 147 changes to the short condition where each movable funnel 145 is lowered as shown in the left intake pipe 147 in FIG. 5, thereby increasing the volumetric efficiency of intake air at a high engine speed.

Such expansion and contraction of each intake pipe 147 is made by each actuator 148 that is controlled by the engine control unit 65 (see FIG. 1) as a control device according to an engine speed signal.

As described above with reference to FIGS. 2, 4, and 5, the vehicle 10 includes the front and rear variable intake pipe length devices 31 capable of adjusting the lengths of the front and rear intake pipes 147 according to the condition of the engine 17, wherein the front and rear intake pipes 147 are respectively provided in the front and rear intake passage portions 121 and 122 as intake passages for inducing air from the air cleaner box 123 to the front and rear intake ports 91b of the engine 17, and each intake pipe 147 includes the fixed funnel 144 and the movable funnel 145 movable relative to the fixed funnel 144 which is movable by a driving force of the actuator 148. In this configuration, a part of the intake pipe 147 is rotationally driven by the actuator 148, and the movable funnel 145 is moved by rotating this part of the intake pipe 147, thereby varying the length of the intake pipe 147. If the movable funnel 145 is driven by a link mechanism, for example, the link mechanism may become large in size for a multicylinder engine and the number of parts may also be increased. To the contrary, according to the present invention, a part of the intake pipe 147 is rotationally driven by the actuator 148. Accordingly, the number of parts can be reduced and the cost can therefore be suppressed. Further, the rotating pipe 151 as a part of the intake pipe 147 does not project outside the intake pipe 147, so that each variable intake pipe length device 31 can be reduced in size.

A part of the intake pipe 147 is provided by the rotating pipe 151 to be rotated by the actuator 148. The spiral slit 151a is formed in a cylindrical portion 151b of the rotating pipe 151, and the movable funnel 145 is formed with the pin-like connecting portion 145f as an inward projection. The pin-like connecting portion 145f is engaged with the spiral slit 151a, so that when the rotating pipe 151 is rotated, the movable funnel 145 is moved to vary the length of the intake pipe 147. Accordingly, each variable intake pipe length device 31 can be configured by a simple structure and can be reduced in size.

The fixed funnel 144 functions to guide the movement of the movable funnel 145. Accordingly, the movement of the movable funnel 145 can be made smooth by the fixed funnel 144.

The fixed funnel 144 is formed with the axially extending vertical slits 144a for preventing the rotation of the movable funnel 145 and guiding the movement of the movable funnel 145, and the movable funnel 145 is formed with the projections 145a and 145b as outward projections. The projections 145a and 145b are engaged with the vertical slits 144a, so that the movement of the movable funnel 145 can be made smoother with the rotation thereof prevented by the engagement of the projections 145a and 145b and the vertical slits 144a.

When the rotational speed of the engine 17 is at a predetermined speed (e.g., 4000 rpm) or more, the movable funnel 145 is moved by the rotation of the rotating pipe 151 driven by the actuator 148, so that the length of the intake pipe 147 is reduced to a small value (e.g., the length of the intake pipe represents L1) smaller than a predetermined length, such that the rotating pipe 151 is stored inside of the movable funnel 145. Accordingly, any step between the movable funnel 145 and the rotating pipe 151 can be eliminated, so that a high-velocity flow of intake air in a high engine speed region can be made smoother to thereby further improve the engine performance.

As shown in FIGS. 1 and 5, when the operator of the vehicle operates to stop the engine 17, the movable funnel 145 is driven by the actuator 148 under the control of the engine control unit 65 as a control means to set a large value (e.g., the length of the intake pipe represents L2) for the length of the intake pipe 147 at starting of the engine 17. Accordingly, the intake pipe length at engine starting can be optimized.

As shown in FIGS. 5 and 9, a means for maintaining the raised position of the movable funnel 145 to prevent lowering of the movable funnel 145 due to its own weight when the operation of the actuator 148 is stopped is provided between the actuator 148 and the movable funnel 145. More specifically, the horizontal slit 151e as the means for maintaining the raised position of the movable funnel 145 is formed in the rotating pipe 151. Accordingly, even when the operation of the actuator 148 is stopped, the length of the intake pipe 147 can be maintained at an optimum length to thereby ensure a desired engine performance.

The means for maintaining the raised position of the movable funnel 145 is provided by the horizontal slit 151e extending in the circumferential direction of the rotating pipe 151 so as to be formed as a part of the spiral slit 151a or formed continuously with the spiral slit 51a. By the formation of the horizontal slit 51e, lowering of the movable funnel 145 in the raised condition thereof can be prevented, so that an unexpected change in intake pipe length can be easily prevented by a simple structure.

Figure 10:
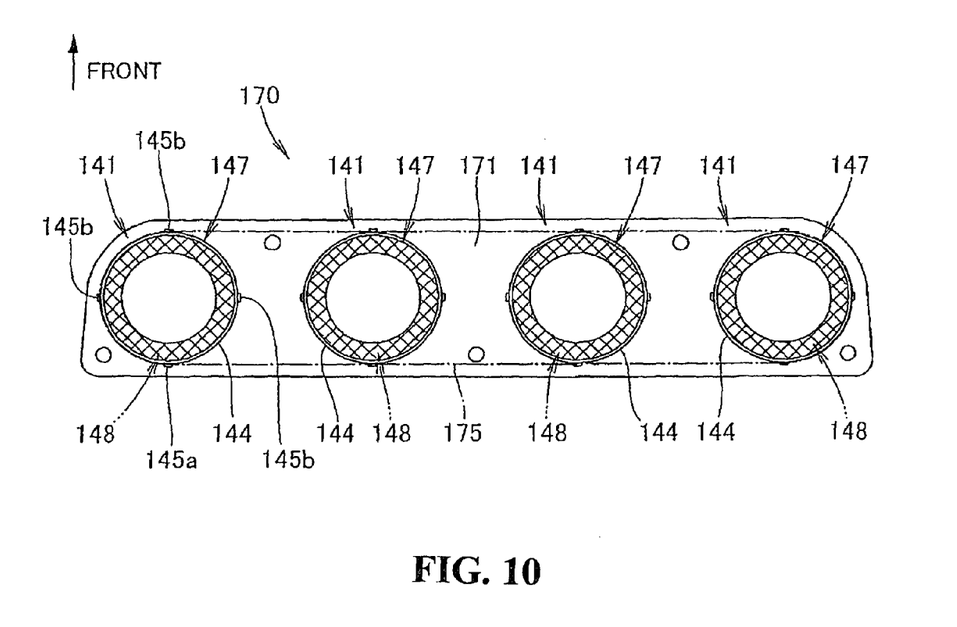
FIG. 10 is a plan view of a variable intake pipe length device according to a second preferred embodiment of the present invention.

FIG. 10 is a plan view of a variable intake pipe length device 170 according to a second preferred embodiment of the present invention. The variable intake pipe length device 170 is adapted to a straight four-cylinder engine. As shown in FIG. 10, the variable intake pipe length device 170 is composed of a base plate 171 and four variable-length air funnels 141 mounted on the base plate 171.

Four actuators 148 (crosshatched areas) are located inside of an envelope 175 (chain line forming an oval shape) formed by the contours of four intake pipes 147, i.e., by the contours of four fixed funnels 144.

In this variable intake pipe length device 170, all of the four actuators 148 for the first to fourth cylinders are operated simultaneously. Alternatively, the two actuators 148 for the first and fourth cylinders are operated simultaneously, and the two actuators 148 for the second and third cylinders are operated simultaneously.

As a modification, the four actuators 148 for the first to fourth cylinders may be operated independently.

Figure 11:
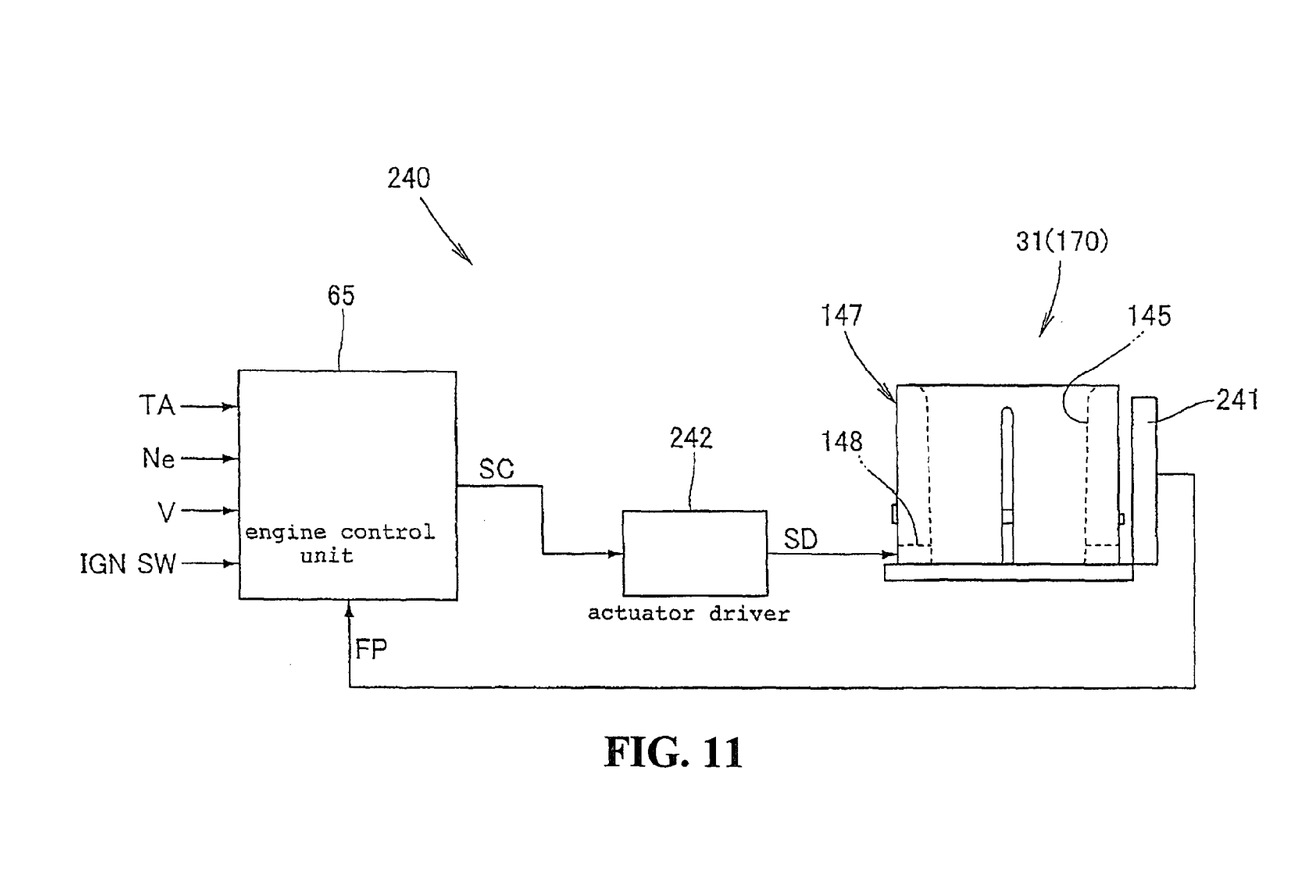
FIG. 11 is a block diagram of an intake pipe length control device for controlling the operation of the variable intake pipe length according to the present invention.

FIG. 11 is a block diagram of an intake pipe length control device 240 for controlling the operation of the variable intake pipe length device according to the present invention. The intake pipe length control device 240 is composed of a position detection sensor 241 for detecting the length of each intake pipe 147, i.e., the position of each movable funnel 145 in each variable intake pipe length device 31 (or the variable intake pipe length device 170), the engine control unit 65 as control means into which throttle angle information (TA), engine speed (Ne), vehicle speed (V), ignition switch information (IGN SW), and funnel position detection signal (FP) from the position detection sensor 241 are input, and an actuator driver 242 controlled by a control signal (SC) output from the engine control unit 65 according to the throttle angle information (TA), the engine speed (Ne), the vehicle speed (V), the ignition switch information (IGN SW), and the funnel position detection signal (FP). The actuator driver 242 transmits a drive signal (SD) to each actuator 148 according to the control signal (SC) to thereby drive each actuator 148.

For example, when the engine speed Ne becomes a predetermined speed or more, the engine control unit 65 operates each actuator 148 through the actuator driver 242 to thereby move each movable funnel 145 so that the length of each intake pipe 147 becomes a small value for a high engine speed, and this small value is smaller than a predetermined length.

Further, when the operator turns off an ignition switch to stop the engine, the engine control unit 65 operates each actuator 148 through the actuator driver 242 to thereby move each movable funnel 145 so that the length of each intake pipe 147 becomes a large value for a low engine speed ready for the next starting of the engine.

While the horizontal slit 151e is so formed as to continue with the upper end of the spiral slit 151a in each preferred embodiment as shown in FIG. 9, the horizontal slit 151e may be formed at some midpoint in the spiral slit 151a.

The present invention is applicable to a two-wheel vehicle or a four-wheel vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle including an intake passage for inducing air from an air cleaner box to an intake port of an engine, comprising:
    a variable intake pipe length device including:
        an intake pipe including a fixed funnel, a movable funnel movable relative to said fixed funnel and a rotating part,
        an actuator capable of providing a driving force to adjust the length of said intake pipe according to a condition of the engine,
    wherein said intake pipe is provided in the intake passage for inducing air from the air cleaner box to the intake port of the engine,
    wherein said rotating part of said intake pipe is rotationally driven by said actuator, and said movable funnel is moved by rotating said rotating part of said intake pipe, thereby varying the length of said intake pipe,
    wherein said fixed funnel and said movable funnel have a same axis, in a length-wise direction thereof,
    wherein said rotating part of said intake pipe is a rotating pipe, said rotating pipe comprising a spiral slit formed at a cylindrical portion of said rotating pipe, and
    wherein said movable funnel includes an inward projection engaged with said spiral slit, such that when said rotating pipe is rotated, said movable funnel is moved by the rotation of said spiral slit to thereby vary the length of said intake pipe.

2. The vehicle according to claim 1, wherein said fixed funnel guides the movement of said movable funnel.

3. The vehicle according to claim 2,
wherein said fixed funnel comprises an axially extending vertical slit for preventing the rotation of said movable funnel and guiding the movement of said movable funnel, and
wherein said movable funnel further comprises an outward projection engaged with said vertical slit.

4. The vehicle according to claim 2, wherein, when a rotational speed of the engine is a predetermined speed or greater, said movable funnel is moved by the rotation of said rotating pipe driven by said actuator, such that the length of said intake pipe is reduced to less than a predetermined length, and where said rotating pipe is stored inside of said movable funnel.

5. The vehicle according to claim 3, wherein, when a rotational speed of the engine is a predetermined speed or greater, said movable funnel is moved by the rotation of said rotating pipe driven by said actuator, such that the length of said intake pipe is reduced to less than a predetermined length, and where said rotating pipe is stored inside of said movable funnel.

6. The vehicle according to claim 1, wherein, when a rotational speed of the engine is a predetermined speed or greater, said movable funnel is moved by the rotation of said rotating part driven by said actuator, such that the length of said intake pipe is reduced to less than a predetermined length, and where said rotating part is stored inside of said movable funnel.

7. The vehicle according to claim 1, wherein, when the engine stops, said movable funnel is driven by said actuator, under the control of a control means, to set the length of said intake pipe to a predetermined length for the next starting of said engine.

8. The vehicle according to claim 7, further comprising a means for maintaining the raised position of said movable funnel, disposed between said actuator and said movable funnel.

9. The vehicle according to claim 8, wherein said means for maintaining the raised position of said movable funnel is a horizontal slit extending in the circumferential direction of said rotating pipe, formed as a part of said spiral slit or formed continuously with said spiral slit.

* * * * *